June 14, 1966  A. A. HEYMAN  3,255,555
APPARATUS FOR FORMING SURFACES OF OPTICAL ELEMENTS
Filed Dec. 24, 1963  2 Sheets-Sheet 1

INVENTOR
ALBERT A. HEYMAN

BY *Albert J. Kramer*

ATTORNEY

INVENTOR
ALBERT A. HEYMAN

BY *Albert J. Kramer*
ATTORNEY

United States Patent Office 3,255,555
Patented June 14, 1966

3,255,555
APPARATUS FOR FORMING SURFACES OF OPTICAL ELEMENTS
Albert A. Heyman, 3820 Chatham Road, Baltimore, Md.
Filed Dec. 24, 1963, Ser. No. 333,145
1 Claim. (Cl. 51—204)

This invention relates to the manufacture of optical elements and it is more particularly concerned with apparatus for use in generating surfaces of optical elements and to methods for carrying out the operations based thereon.

In the manufacture of optical elements, one of the most difficult problems is in the formation of aspheric surfaces, that is, surfaces which are other than spherical or sectons of a sphere. A typical problem is presented in generating a concave parabolic surface used, for example, as a telescope reflector. Conventionally, these surfaces are formed by first forming a concave spherical surface on one face of the optical glass blank. This is a relatively simple operation and can be accomplished by means of various conventional grinding machines. This spherical surface is then subjected to a further polishing operation by hand to modify it to a parabolic surface. The conventional device for this purpose is a lap comprising a mass of optical pitch or any material of similar properties supported on a pallet or block, the pitch being coated with optical rouge (iron oxide). The operator then proceeds to work the spherical surface over the lap by sliding motions until the desired modification is achieved. This phase of the procedure is difficult because it is rarely possible to judge precisely when the critical parabolic surface has been achieved. Usually, there is an over polishing which destroys the parabolic surface and renders it a hyperbolic surface which does not provide the same optical effect. The problem is then to reshape the hyperbolic surface back to a parabolic surface. This operation becomes tedious because different parts of the glass are involved and the additional danger of over polishing in the opposite direction is again present. This corrective step usually requires ¾ of the entire operation and it is almost impossible in the present state of the art to eliminate it.

One of the objects of the present invention is the provision of means for facilitating this corrective operation and operations of a like nature.

Another object of the invention is the provision of apparatus for achieving a differential lapping effect on optical glass surfaces as may be required in aspherical operations.

A further object of the invention is the provision of means adapted for use with conventional polishing apparatus for controlling the polishing operations on optical surfaces.

These objects, and still further objects, advantages and features of the invention will be apparent from the following description considered together with the accompanying drawing.

Figure 1:
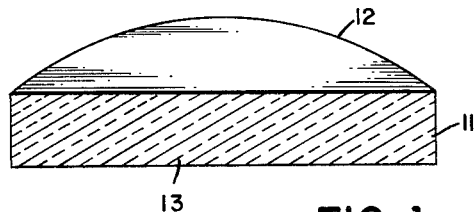
FIG. 1 is a perspective view of a conventional blank of optical glass before being operated upon, partly cut away along a diameter.
Figure 2:
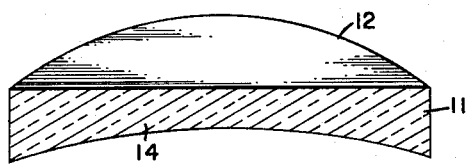
FIG. 2 is a view similar to FIG. 1 after the bottom surface of the blank has been shaped to a spherical form.

Referring to the drawing with more particularity a short cylinder 11 of optical glass having a flat top surface 12 and a flat bottom surface 13 constitutes a typical blank from which an optical element is to be fashioned.

Figure 3:
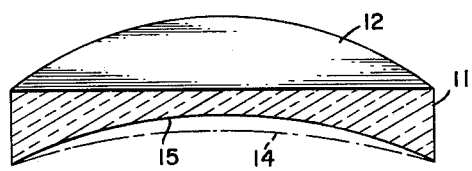
FIG. 3 is a view similar to FIGS. 1 and 2 following shaping of the spherical surface to an aspherical surface.
Figure 4:
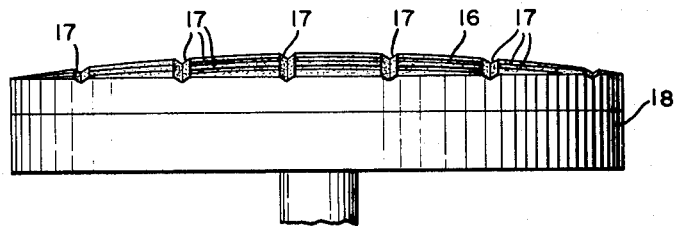
FIG. 4 is an elevational view of a conventional lap form including a pallet containing a deposit of a mass of optical pitch or material of similar properties coated with a layer of optical rouge.

By conventional means (not shown) one of the flat surfaces, say the bottom surface 13 can be readily ground to the shape of a spherical surface 14. When it is desired to modify this spherical surface to, say, a parabolic surface 15 a discreet polishing of the surface must be effected to cut away a required pattern of material (between the lines 14 and 15 of FIG. 3). This is difficult with conventional lap apparatus which, generally, comprises a mass of optical pitch 16 on a pallet 18 with a pattern of fluid run-off grooves or troughs 17 on the top surface, the pitch being coated with optical rouge. See FIG. 4.

Figure 5:
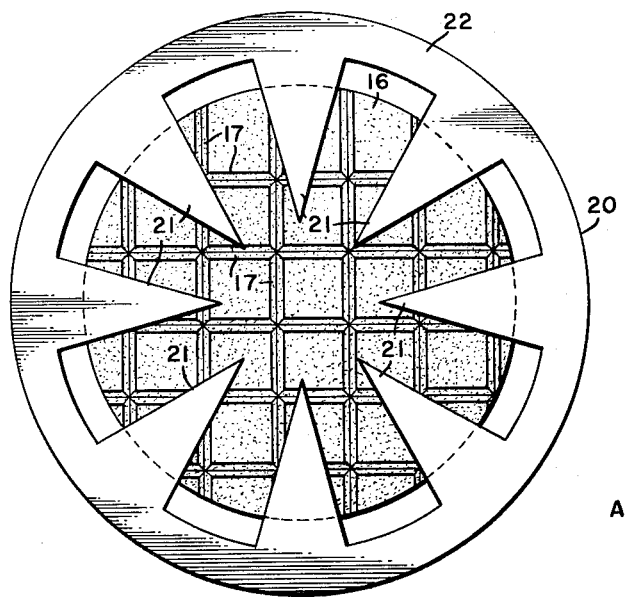
FIG. 5 is a top plan view of the apparatus of FIG. 4 showing a typical impression templet thereon in accordance with this invention.
Figure 6:
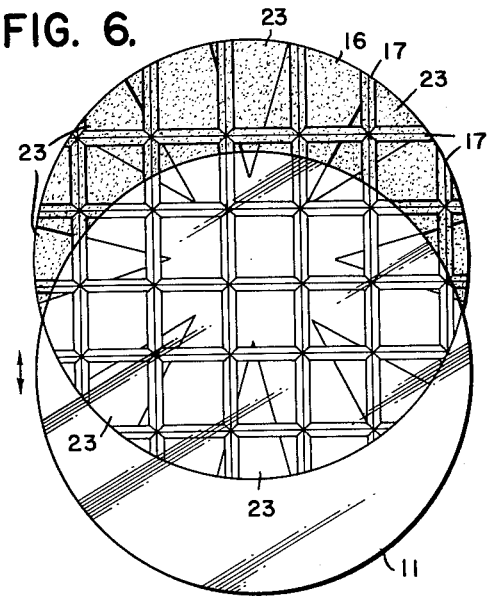
FIG. 6 is a view similar to FIG. 5 with the impression templet removed and showing the optical blank in operative condition relative to the resulting lap surface.

I have found in actual practice that the required differential lapping effect can be achieved by modifying the surface of the pitch with an impression templet having a delineated pattern adapted to provide a predetermined result. For example, in FIG. 5 an impression templet 20 is in the form of radial triangles 21 projecting inwardly from a circular rim 22 adjacent facing sides of the triangles being parallel to each other. This templet is placed over the lapping surface and pressed into it sufficiently to provide corresponding shallow spaced triangular depressions 23. It is then removed, leaving exposed the shallow depressions 23 (see FIG. 6), whereupon the optical element to be shaped is applied to the surface, as illustrated. This templet pattern is particularly effective in producing a greater polishing effect at the center, gradually diminishing toward the periphery. This effect of the polishing operation is due to the decreased area of the lapping surface in contact with the optical blank. A continuation of this operation causes the depressions to eventually vanish. When this occurs, the templet may again be pressed onto the surface to create a fresh pattern of impressions and the polishing can then be resumed. This is repeated until the desired effect is achieved. When it is desired to erase these shallow depressions and return the lap surface to its normal condition, an imperforate member is placed over the surface and pressed against it.

Figure 7:
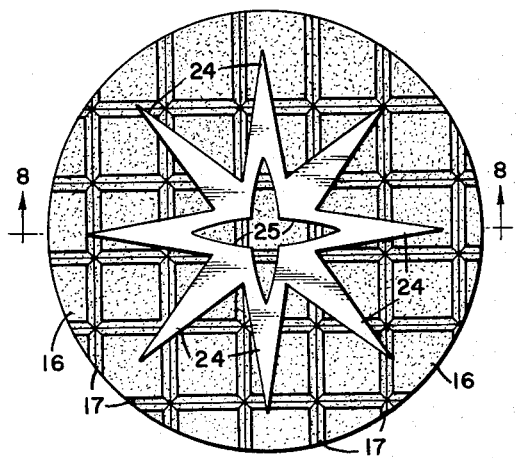
FIG. 7 is a view similar to FIG. 5 in which one pattern of impression templet is used.
Figure 8:
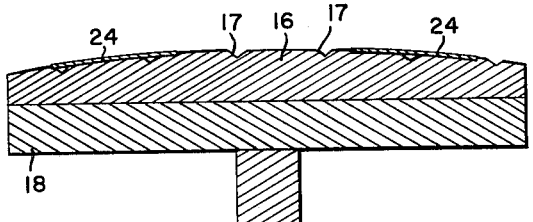
FIG. 8 is a section along the line 8—8 of FIG. 7.
Figure 9:
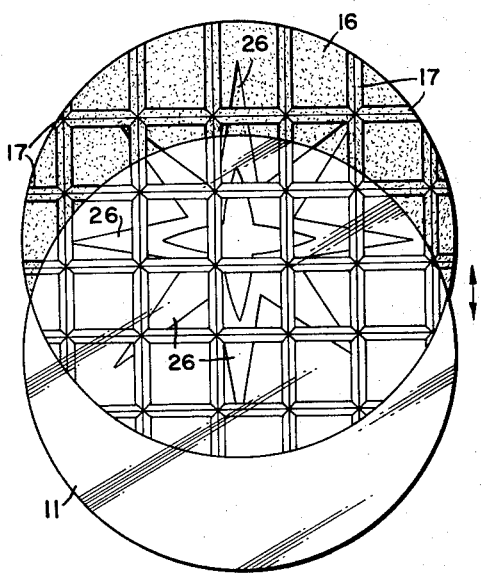
FIG. 9 is a view similar to FIG. 6 in which the impression templet of FIG. 7 has been removed.

In FIG. 7 a different pattern of impression templet is shown which is in the general form of an eight pointed star having outwardly projecting triangles 24 and a cross-shaped central cut-out portion 25. When the templet is removed, the impressions 26 remain. This impression templet is particularly effective in reversing the effect of a lapping operation that resulted in a hyperbolic surface. This is sometimes referred to in the art as "climbing out of a hyperbola." If the hyperbolic surface is excessively deep at the center, the center cross cut-out portion 25 may be omitted.

Figure 10:
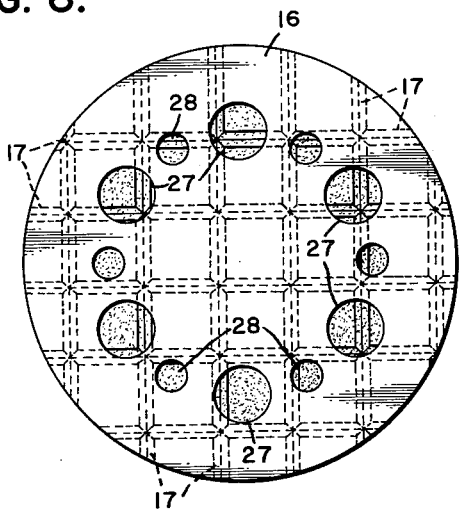
FIG. 10 is a top plan view similar to FIG. 5 showing another form of impression templet.

In FIG. 10 there is shown an impression templet having a series of perforations consisting of alternating large circular perforations 27 and smaller circular perforations 28 which leave correspondingly raised zones on the lap. This design is found to be particularly effective to treat special raised zones of the glass surface. These perforations may be arranged in any pattern and at any location desired or required to produce the effect needed.

Other forms of impression templets can be used depending upon the effect to be achieved on the surface to be operated on. It is to be understood that the invention is not limited, therefore, to the particular impression templets shown and that they are shown herein only by way of illustration and not by way of limitation.

The impression templets are conveniently formed of a suitable sheet material, such as cardboard, plastic, or other sheet material and can be of any thickness desired depending upon the depth of impressions to be provided in any particular case.

Having thus described my invention, I claim:

In a lap having a rouge coated mass of optical pitch or material of similar properties supported on a pallet, and a grid pattern of run-off channels over the surface of the lap, the improvement comprising a geometrical pattern of relatively shallow depressions on the surface of the pitch adapted to provide a predetermined abrading effect against an optical glass surface to be moved in contact therewith.

References Cited by the Examiner
UNITED STATES PATENTS

| | | | |
|---|---|---|---|
| 1,703,785 | 2/1929 | Shuttleworth | 18—1 |
| 2,451,295 | 10/1949 | Metzger et al. | 51—209 |
| 2,479,078 | 8/1949 | Milligan et al. | 51—209 |
| 2,607,174 | 8/1952 | Lanius | 51—284 |
| 2,704,705 | 3/1955 | Gifford | 51—293 |
| 2,899,288 | 8/1959 | Barclay | 51—293 |
| 3,069,721 | 12/1962 | Arnie et al. | 18—1 |
| 3,142,140 | 7/1964 | Ishida | 51—284 |

ROBERT C. RIORDON, *Primary Examiner.*

LESTER M. SWINGLE, *Examiner.*

L. S. SELMAN, *Assistant Examiner.*